May 3, 1949.  O. J. POUPITCH  2,469,311
SCREW LOCKING DEVICE
Filed March 22, 1945
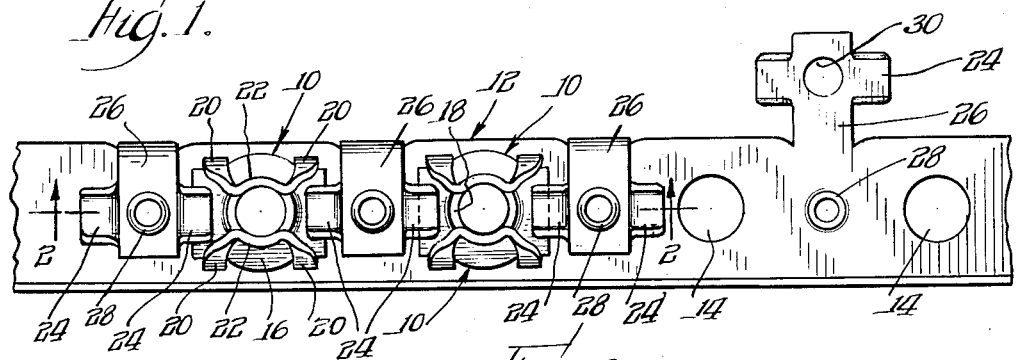
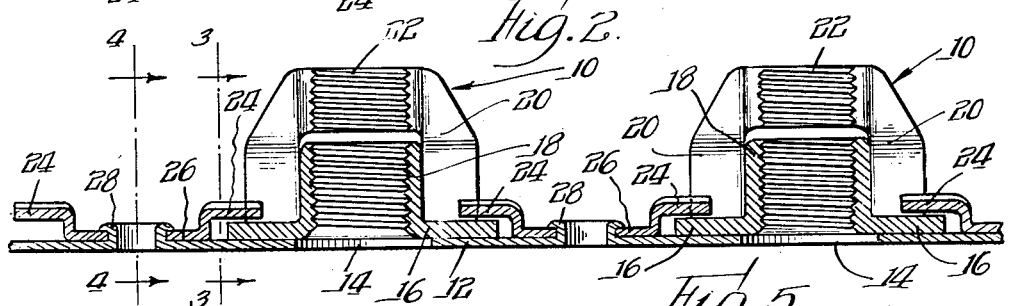
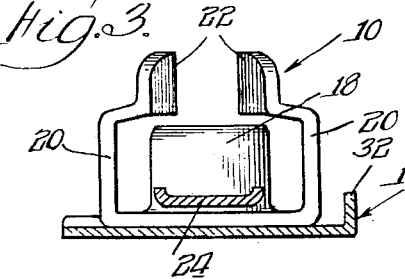
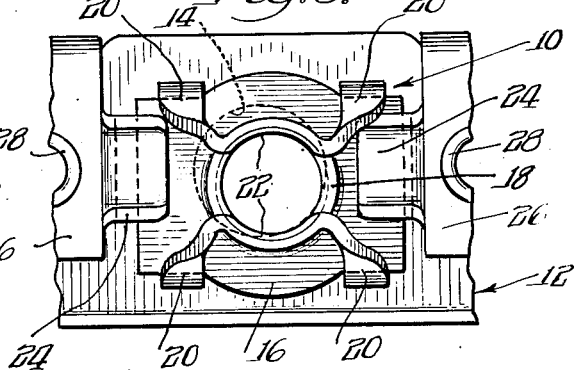
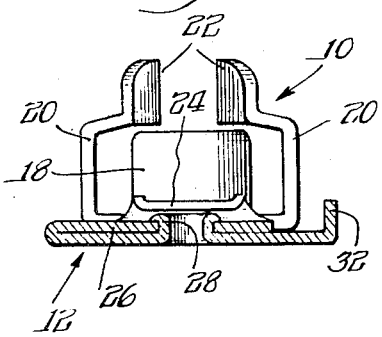
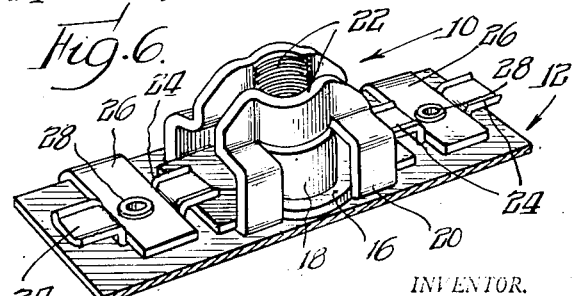
INVENTOR.
Ougljesa Jules Poupitch
BY
Softus, Moore, Olson & Trexler
attys.

Patented May 3, 1949

2,469,311

UNITED STATES PATENT OFFICE 2,469,311

SCREW LOCKING DEVICE

Ougljesa Jules Poupitch, Chicago, Ill., assignor to Illinois Tool Works, Chicago, Ill., a corporation of Illinois Application March 22, 1945, Serial No. 584,099

4 Claims. (Cl. 85—32)

1

This invention relates generally to screw locking devices and more particularly to screw locking devices in which a lock nut is supported upon a base plate in such a manner as to permit limited shifting of the lock nut with respect to a screw accommodating aperture in the base plate.

The present invention is primarily concerned with an apertured nut supporting plate having in association therewith a lock nut and a novel nut anchoring means forming an integral extension or arm of the supporting plate for securing the lock nut in proper position upon the plate.

More specifically the invention contemplates an arrangement of the type set forth above wherein the lock nuts are supported in spaced relation along a strip or base plate, the nut anchoring arms serving to permit limited shifting of a lock nut companion thereto so as to facilitate registration with a screw member inserted through an aperture in the supporting plate.

Still more specifically the invention contemplates a device as outlined above wherein the arms integral with and extending from the margin of the plate are positively secured against separation from the plate and provide means in the form of lateral extensions adapted to overlie portions of the lock nut so as to secure the lock nut in proper position and at the same time to permit limited shifting thereof along the supporting plate.

The foregoing and other objects and advantages will be more apparent from the following detailed description when considered in connection with the accompanying drawing wherein:

Fig. 1 is a plan view disclosing a screw locking nut device mounted along a metallic strip or plate in accordance with the teachings of the present invention;

Fig. 2 is an enlarged vertical sectional view taken substantially along the line 2—2 of Fig. 1;

Fig. 3 is a vertical sectional view taken substantially along line 3—3 of Fig. 2;

Fig. 4 is also a vertical sectional view similar to Fig. 3 but taken along the line 4—4 of Fig. 2;

Fig. 5 is an enlarged plan view disclosing one of the screw locking devices or nuts in a shifted position eccentric with respect to the aperture in the supporting plate; and Fig. 6 is a fragmentary perspective view to more clearly illustrate the structural characteristics of the lock nut and arms securing said lock nut in position upon the plate.

Referring now to the drawing wherein like numerals have been employed to designate similar parts throughout the various figures it will be seen

2 that one embodiment of the present invention contemplates a screw receiving and locking device including a lock nut designated generally by the numeral 10 and a base plate or strip designated generally by the numeral 12. In Fig. 1 the plate 12 is of metallic strip form provided with a series of spaced screw receiving apertures 14. Each of the lock nuts 10 is formed from a single piece of sheet metal stock and includes a base section 16 formed with a central internally threaded extrusion 18.

Extending laterally from opposite sides of the base section 16 and formed integrally therewith are arms 20. It will be seen from the drawing that the portion of the arms 20 adjacent the base are substantially normal to the plane of the base, and the portions of the arms spaced from the base are bent inwardly. These inwardly bent portions of the arms 20 support arcuate or segmental screw locking portions 22. Each segmental portion 22 cooperates with the oppositely disposed segmental portion to provide a section which may be referred to as a split threaded section for lockingly engaging the periphery of a screw. The arms 20 are sprung inwardly toward each other a sufficient amount to position the partial thread convolutions of the locking portions 22 inwardly with respect to the diameter of the screw shank adapted to be received by the internally threaded extrusion 18. Thus when a screw is turned within the extrusion 18 and the entering extremity ultimately engages the locking portions 22, these portions must be sprung outwardly against the tension provided by the spring arms 20. The thread engaging area of the locking portions 22 are of substantial arcuate and axial extent so that the spring action of the arms 20 will be sufficient to exert the required locking force to secure a screw against unintentioned loosening.

Particular attention is directed to the fact that sufficient space is provided between oppositely disposed arms 20 to permit the accommodation therebetween of lateral extensions or projections 24 formed integral with nut anchoring arms 26. These nut anchoring arms 26 extend marginally from and are formed integral with the supporting base plate 12. The arms are bent over into superimposing relation with respect to the supporting plate as clearly illustrated in Fig. 4. An eyelet extrusion 28 on the supporting plate 12 extends through a complementary aperture in each arm 26 and is crimped so as to firmly secure the arm against the plate. The lateral extensions 24 are positioned above the plane of the arm 26 so as to overlie the base 16 of the complementary lock nut 10. The extensions 24 are preferably deflected along opposite margins thereof so as to render them channel-like in cross-section and thereby lend considerable rigidity.

From the foregoing it will be apparent that extrusions 24 overlie opposite portions of the nut base 16 and permit limited shifting of the nut along the plate 12. In Fig. 1 the nuts are disclosed in concentric registration with the complemental aperture 14 in the plate whereas in Fig. 5 the nut is shown in eccentric position of registration with respect to the aperture 14. By this arrangement the ease with which the entering extremity of a screw inserted within the aperture 14 registers with the internal threads of the extrusion 18 is greatly facilitated. While the nuts are capable of being shifted within specified limits along the surface of the supporting plate 12 they are positively secured against separation from the plate by the anchoring means comprising the arms 26 and the lateral extensions 24 formed integral therewith. At the right extremity of Fig. 1 one of the arms 26 is shown in the position which it occupies before it is bent over the plate 12. After lock nuts have been placed in registering association with the apertures 14 the arms 26 may be bent over the plate 12 so as to carry the aperture 30 into registration with the eyelet extrusion 28 of the plate. Subsequently this extrusion 28 is upset so as to positively secure the arm in superimposed relation with respect to the supporting plate. It will also be noted that the segmental screw locking portions 22 adjacently overlie the outer extremity of the extrusion 18. The supporting plate 12 is disclosed as having a stiffening or strengthening flange 32 formed along one margin thereof. Obviously a strip or plate may be employed with or without this strengthening flange depending upon the intended use or application of the device.

It will be apparent from the foregoing that the invention contemplates a screw locking device of extremely simple and practical construction which may be stamped and formed from sheet metal. No special machining operations are required and the simple arrangement of the anchoring means formed integral with the nut supporting plate provides a very positive means for securing a series of lock nuts along a supporting strip. The spring arms extending from the base portions provide the required resiliency for rendering the split threaded section efficiently effective for securing screw elements against loosening. Also the spaced relationship of these arms presents a very practical arrangement for accommodating the lateral locking extensions of the anchoring arms formed marginally integral with the supporting plate. It will also be apparent that no separate or auxiliary means is required to secure the nut anchoring arms in superimposed relation with respect to the supporting plate. This is accomplished by the simple expedient of the integral eyelet extrusion as previously described. The aperture within the eyelet extrusion serves to receive a fastener such as a rivet or screw for securing the strip to a supporting structure. Such a fastening cooperates with the swedged portion of the eyelet in positively securing the nut anchoring arm against loosening.

Obviously for purposes of illustration certain specific structural details have been disclosed herein. However, the invention is not limited to these structural details but is capable of other modifications and changes without departing from the spirit and scope of the appended claims.

I claim:

1. A locking device for screws including a nut supporting plate having a plurality of screw accommodating apertures, a nut member companion to each aperture supported on said plate, each nut including a base portion and side members projecting laterally from opposite edges of said base portion, and nut anchoring means including integral arms extending from one edge of said plate, said arms being folded over and superimposing said plate, and having laterally extending portions overlying opposite sections of the bases of adjacent companion nuts between a pair of side members thereof, the extremities of said laterally extending portions being in substantial alignment with the apertures longitudinally of said supporting plate.

2. A locking device in accordance with claim 1 having means for securing said arms against the adjacent surface of the plate.

3. A locking device for screws in accordance with claim 2, wherein the laterally extending portions overlying the base are positioned a greater distance from the nut supporting plate than the remaining portion of said arms in order to accommodate a nut base.

4. A locking device in accordance with claim 1 wherein the edge of the plate oppositely disposed from the edge from which the arms extend is provided with a stiffening flange.

OUGLJESA JULES POUPITCH.

REFERENCES CITED

The following references are of record in the file of this patent:

UNITED STATES PATENTS

| Number | Name | Date |
|---|---|---|
| 2,243,923 | Swanstrom | June 3, 1941 |
| 2,249,923 | Whitcombe | July 22, 1941 |
| 2,321,755 | Kost | June 15, 1943 |
| 2,395,142 | Poupitch | Feb. 19, 1946 |

FOREIGN PATENTS

| Number | Country | Date |
|---|---|---|
| 140,262 | Great Britain | Mar. 25, 1920 |
| 298,044 | Great Britain | Oct. 4, 1928 |
| 483,089 | Great Britain | Apr. 12, 1938 |
| 545,898 | Great Britain | June 17, 1942 |